United States Patent
Bettinson et al.

(10) Patent No.: US 10,026,179 B2
(45) Date of Patent: Jul. 17, 2018

(54) UPDATE SET OF CHARACTERISTICS BASED ON REGION

(71) Applicant: Longsand Limited, Cambridge (GB)

(72) Inventors: David Bettinson, Cambridge (GB); Tom Rosoman, Cambridge (GB); Chris Smith, Cambridge (GB); Unai Ayo Aresti, Cambridge (GB)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/050,825

(22) Filed: Feb. 23, 2016

(65) Prior Publication Data

US 2017/0243353 A1    Aug. 24, 2017

(51) Int. Cl.
*G06K 9/00* (2006.01)
*G06T 7/00* (2017.01)
*G08B 29/18* (2006.01)

(52) U.S. Cl.
CPC ........ *G06T 7/0042* (2013.01); *G06K 9/00771* (2013.01); *G08B 29/185* (2013.01); *G06T 2207/20104* (2013.01); *G06T 2207/30232* (2013.01)

(58) Field of Classification Search
USPC ......................................................... 382/103
See application file for complete search history.

(56) References Cited

U.S. PATENT DOCUMENTS 7,391,907 B1    6/2008  Venetianer et al.
2008/0184245 A1    7/2008  St-Jean
2010/0002142 A1    1/2010  Finn et al.
2014/0247347 A1    9/2014  McNeill et al.

OTHER PUBLICATIONS

Georis, B, et al., "Real-Time Control of Video Surveillance Systems with Program Supervision Techniques," (Research Paper), Machine Vision and Applications 18.3-4, 2007, pp. 189-205, available at http://www-sop.inria.fr/members/Francois.Bremond/Postscript/mva-benoit.pdf.*

Georis, B. et al., "Real-Time Control of Video Surveillance Systems with Program Supervision Techniques," (Research Paper), Machine Vision and Applications 13.3-4, 2007, pp. 189-205, available at http://www-sop.inria.fr/members/Francois.Bremond/Postscript/mva-benoit.pdf.

* cited by examiner

*Primary Examiner* — Gregory F Cunningham

(57) ABSTRACT

An object may be identified, if each measured value of a characteristic of the object is within a corresponding range of a set of characteristics. The object may then be classified as a true alarm or false alarm by a user. Next, the measured values of the object may be added as a data point to a set of data points. Each of data points is along a plurality of dimensions and each of the dimensions corresponds to one of the set of characteristics. Further, each of the data points has been classified as a true alarm or false alarm.

The range of the set of characteristics may be updated to reduce a weighted score based on a number of the true alarms that are outside a region along the plurality of dimensions and a number of the false alarms inside the region for the set of data points. The region is defined based on numerical analysis of the set of data points. The weighted score may provide separate weights to the true alarms outside the region and the missed alarms inside the region.

20 Claims, 3 Drawing Sheets

UPDATE SET OF CHARACTERISTICS BASED ON REGION

BACKGROUND

Recording devices, such as cameras, may capture images and attempt to identify objects within the captured images. Manufacturers, vendors and/or clients are challenged to more accurately trigger alarms when objects of interest are identified within the captured images.

BRIEF DESCRIPTION OF THE DRAWINGS

The following detailed description references the drawings, wherein.

DETAILED DESCRIPTION

Figure 1:
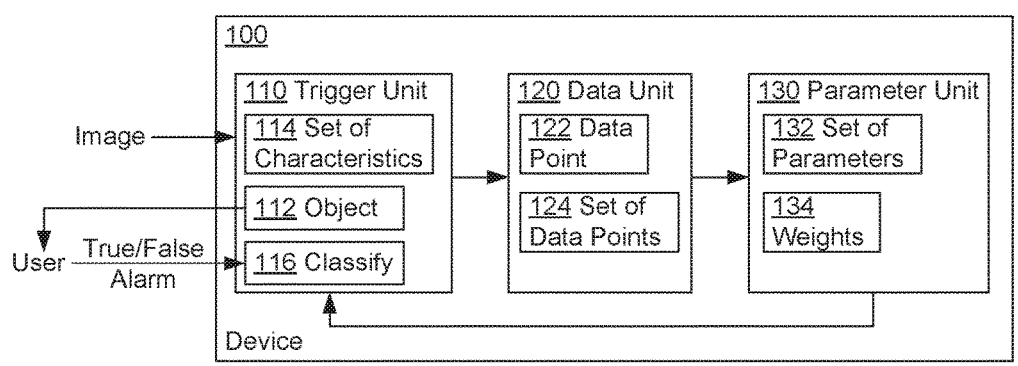
FIG. 1 is an example block diagram of a device to update a set of characteristics based on a region.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Video analytics systems may produce false and missed alarms. Some applications may accept some false alarms but no missed alarms, while other applications may need to keep alarm accuracy high to avoid users losing confidence in the system. Thus, there is a challenge to configure a system to reduce certain types of alarms in a way that suits a particular application.

Video analytics may be configured by drawing boxes, lines or arrows to identify regions of interest (ROI), objects within the ROI, size of an object, speed of an object, direction of an object, etc. These settings are sometimes manually changed by reviewing a few system alarms. However, using single alarms as the example sample from which to set up the configuration may present issues. For example, the sample may not be the most representative and the system may not have knowledge of the variation in values. Further, there may be no accurate way to set the system to increase accuracy (reduce or minimize false alarms) or increase alarm capture rate (reduce or minimize missed alarms).

Examples provide a multi-dimensional optimization to automatically configure a video analysis system using user classified alarms and a weighting between minimizing missed and false alarms. In one example, an object may be identified, if each measured value of a characteristic of the object is within a corresponding range of a set of characteristics. The object may then be classified as a true alarm or false alarm by a user. Next, the measured values of the object may be added as a data point to a set of data points. Each of data points is along a plurality of dimensions and each of the dimensions corresponds to one of the set of characteristics. Further, each of the data points has been classified as a true alarm or false alarm.

The range of the set of characteristics may be updated to reduce a weighted score based on a number of the true alarms that are outside a region along the plurality of dimensions and a number of the false alarms inside the region for the set of data points. The region is defined based on numerical analysis of the set of data points. The weighted score may provide separate weights to the true alarms outside the region and the missed alarms inside the region.

Thus, examples may provide a relatively simple configuration for improving or optimizing video analytics for use in a real time or retrospective system. Further, examples may allow a user to change the priorities between minimizing missed and false alarms, to see how the new setup would perform in terms of alarm accuracy versus alarm capture rate. Thus, examples may allow for missed or false alarm rates to be customized to particular applications. For example, real time systems may seek higher accuracy whereas retrospective systems may seek a greater alarm capture rate.

Referring now to the drawings, FIG. 1 is an example block diagram of a device 100 to update a set of characteristics based on a region. The device 100 may include or be part of a microprocessor, a controller, a memory module or device, an image capture device, a notebook computer, a desktop computer, an all-in-one system, a server, a network device, a wireless device, a network and the like.

The device 100 is shown to include a trigger unit 110, a data unit 120 and a parameter unit 130. The trigger, similarity and parameter units 110, 120 and 130 may include, for example, a hardware device including electronic circuitry for implementing the functionality described below, such as control logic and/or memory. In addition or as an alternative, the trigger, similarity and parameter units 110, 120 and 130 may be implemented as a series of instructions encoded on a machine-readable storage medium and executable by a processor.

The trigger unit 110 may trigger an alarm in response to identifying an object 112 in an image based on a set of characteristics 114. The object 112 is to be classified 216 by a user as one of a true alarm and a false alarm. The true alarm may indicate that the alarm for object 112 was correctly triggered while the false alarm may indicate that the alarm for object 112 was incorrectly triggered.

The data unit 120 may form a first data point 122 based on values for the set of characteristics 114 of the object 112 and to add the first data point 122 to a set of data points 124. Each of the data points may be along a plurality of dimensions and each of the dimensions to correspond to one of the set of characteristics 114.

The parameter unit 130 may determine values for a set of parameters 132 that define a region of space along the plurality of dimensions. The region may be determined based on numerical analysis of the set of data points 124 to reduce a number of the true alarms outside the region and to reduce a number of the false alarms inside the region.

Each of the data points of the set of data points 124 may correspond to an object 112 classified as one of the true alarm and the false alarm. The numerical analysis may change at least one of the values of the set of parameters 132 to redefine the region if a weight 134 for at least one of a missed alarm and the false alarm is changed. The missed alarm may be a true alarm that is outside the region. The trigger unit 210 may update the set of characteristics 114 based on the region. The device 100 is explained in greater detail below with respect to FIGS. 2-4.

Figure 2:
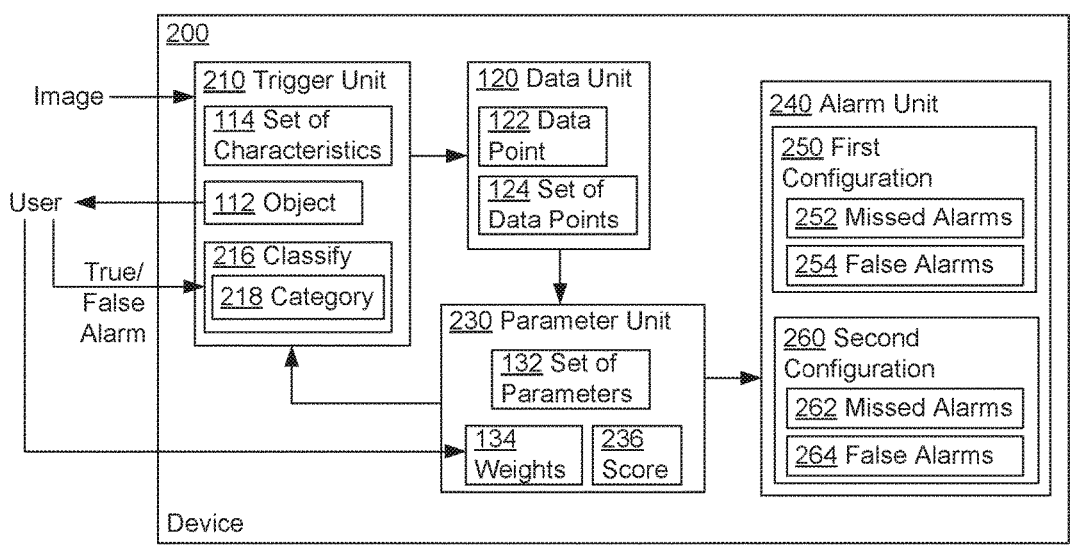
FIG. 2 is another example block diagram of a device to update a set of characteristics based on a region.

FIG. 2 is another example block diagram of a device 200 to update a set of characteristics based on a region. The device 200 may include or be part of a microprocessor, a controller, a memory module or device, an image capture device, a notebook computer, a desktop computer, an all-in-one system, a server, a network device, a wireless device, a network and the like. Further, the device 200 of FIG. 2 may include at least the functionality and/or hardware of the device 100 of FIG. 1. For example, a trigger unit 210 and a parameter unit 230 of the device 200 of FIG. 2 may include at least the respective functionality and/or hardware of the trigger and parameter units 110 and 130 of the device 100 of FIG. 1.

The device 200 of FIG. 2 is also shown to include an alarm unit 240. The alarm unit 240 may include, for example, a hardware device including electronic circuitry for implementing the functionality described below, such as control logic and/or memory. In addition or as an alternative, the alarm unit 240 may be implemented as a series of instructions encoded on a machine-readable storage medium and executable by a processor.

As noted above, the trigger unit 210 may trigger an alarm in response to identifying an object 112 in an image based on a set of characteristics 114. The trigger unit 210 may also analyze a plurality of the images of a video to identify the object 112, such as to improve a scene analysis configuration for a video analysis system. The set of characteristics 114 may include a size, shape, speed, color direction and position of the object 112. The set of characteristics 114 may further include a time the object 112 is in a region of interest (ROI), an edge strength of the object 112, a texture of the object 112, a plane of the object 112 and the like. The plane of the object 112 may include a background, middle ground and/or foreground.

The trigger unit 210 may present to the user at least one of a box, a line and an arrow to indicate at least one of a region of interest (ROI), an object 112 within the ROI, a size of the object 112, a direction of the object 112 and a speed of the object 112. The object 112 is to be classified 216 by a user as one of a true alarm and a false alarm. Examples of the object may include a vehicle, person, and the like.

The data unit 120 may form a first data point 122 based on values for the set of characteristics 114 of the object 112 and to add the first data point 122 to a set of data points 124. Each of the data points 122 may be along a plurality of dimensions and each of the dimensions to correspond to one of the set of characteristics 114. For example, if there are four characteristics being measured, such as speed, direction, size and color, then the data points 122 would be along a four-dimensional space.

The parameter unit 230 may determine values for a set of parameters 132 that define a region of space along the plurality of dimensions. The region may be determined based on numerical analysis of the set of data points 124 to reduce a number of the true alarms outside the region and to reduce a number of the false alarms inside the region. Each of the data points of the set of data points 124 may correspond to an object 112 classified as one of the true alarm and the false alarm.

While the each of the parameters of the set 132 may be along a same number of dimensions as the data points 122, the number of parameters may be independent of the number of the data points. For example, the set of data points 122 for true alarms may be clustered together such that a regular shape may define the region. Thus, less parameters may be needed to define the region. However, if the region is more irregular in shape due to the set of data points 122 for true alarms being more scattered, the number of parameters needed to define the region may be greater.

The numerical analysis may change at least one of the values of the set of parameters 132 to redefine the region if a weight 134 for at least one of a missed alarm and the false alarm is changed. The missed alarm may be a true alarm that is outside the region. The trigger unit 210 may update the set of characteristics 114 based on the region. For instance, the trigger unit 210 may update the set of characteristics 114 to have values within the region. The numerical analysis may be any type of multi-dimensional optimization, such as a downhill simplex method. The downhill simplex method may refer to a numerical method used to find the minimum or maximum of an objective function in a multidimensional space, and may be applied to nonlinear optimization problems for which derivatives may not be known.

In one example, the numerical analysis may initially provide equal weights 134 for the false alarm and the missed alarm. However, the weight 134 for at least one of the missed alarm and the false alarm may be changed by the user, such as via a slider, in order to add greater priority to one of alarm accuracy rate and alarm capture rate. For example, a greater value may be given to the weight 134 of the false alarm relative to the missed alarm to increase the alarm accuracy rate. On the other hand, a greater value may be given to the weight 134 of the missed alarm relative to the false alarm to increase the alarm capture rate. In one instance, the weighting 134 for the false alarm may be based on a ratio of a number of the true alarms to a sum of the number of true alarms and false alarms. The weighting 134 for the missed alarm may be based on a ratio of the number of true alarms to a sum of the number of true alarms and missed alarms.

The alarm unit 240 may calculate a number of the missed alarms 252 and 262 and a number of the false alarms 254 and 264 from the set of data points 124 for each of a first configuration 250 of the set of parameters 132 and a second configuration 260 of the set of parameters 132. The first configuration 250 may be based on the set of data points 124 that do not include the first data point 122 and the second configuration 260 may be based on the set of data points 124 that include the first data point 122. The user may select one of the first and second configurations 250 and 260 based on the presented number of missed and false alarms for the first and second configuration 150 and 160. The first data point 122 may discarded if the user selects the first configuration 250.

In one example, the first configuration 250 may have a missed alarm rate of 40% and a false alarm rate of 1%. However, the user make seek to reduce or minimize missed alarms, such as for an application where a high alarm capture rate is a priority. Thus, the user may shift the weighting to provide a greater cost for missed alarms relative to false alarms, for the second configuration 260. In this case, the first configuration 250 may have a missed alarm rate of 2% and a false alarm rate of 16%.

In another example, the user may further classify 216 each of the true alarms to a type of category 218. Here, the parameter unit 230 may define a separate set of the parameters 132 for each of the types of categories. Further, the parameter unit 130 may to reclassify 216 the true alarm of a first type of category as the false alarm when defining the region for a second type of category 216 separate from the first type of category 216. Example types of categories may include car, truck, pedestrian and the like.

Figure 3:
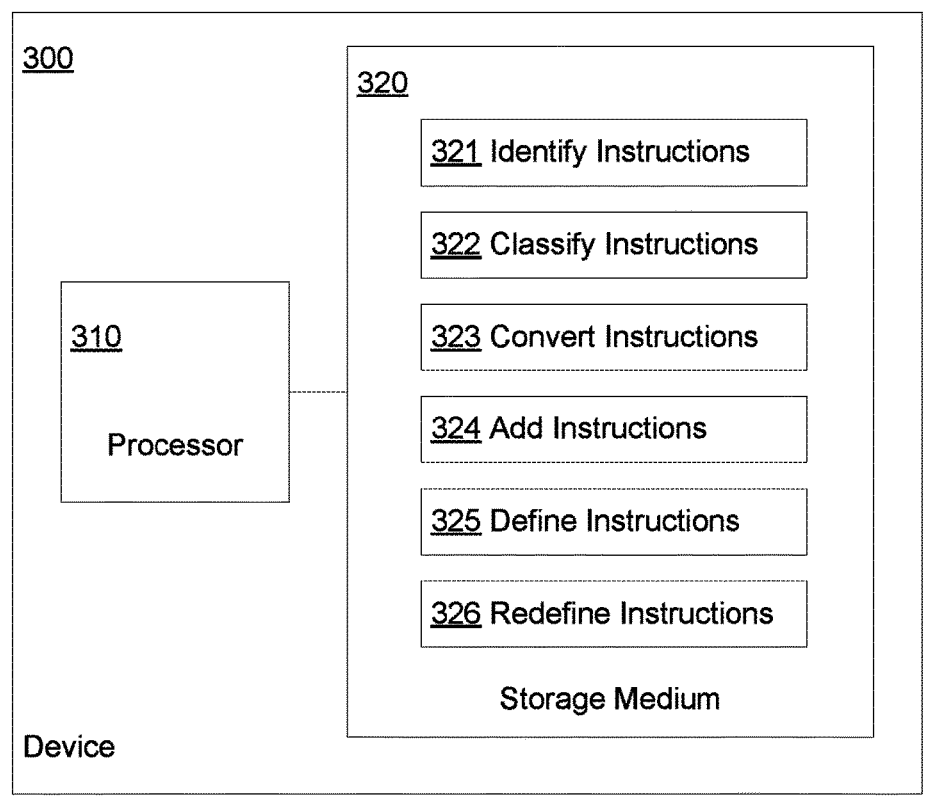
FIG. 3 is an example block diagram of a computing device including instructions for updating a set of characteristics based on a region.

FIG. 3 is an example block diagram of a computing device 300 including instructions for updating a set of characteristics based on a region. In the embodiment of FIG. 3, the computing device 300 includes a processor 310 and a machine-readable storage medium 320. The machine-readable storage medium 320 further includes instructions 321-326 for updating the set of characteristics based on the region.

The computing device 300 may be included in or part of, for example, a microprocessor, a controller, a memory module or device, a notebook computer, a desktop computer, an all-in-one system, a server, a network device, a wireless device, or any other type of device capable of executing the instructions 321-326. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 321-326 to implement updating the set of characteristics based on the region. As an alternative or in addition to retrieving and executing instructions, the processor 310 may include at least one integrated circuit (IC), other control logic, other electronic circuits, or combinations thereof that include a number of electronic components for performing the functionality of instructions 321-326.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for updating the set of characteristics based on the region.

Figure 4:
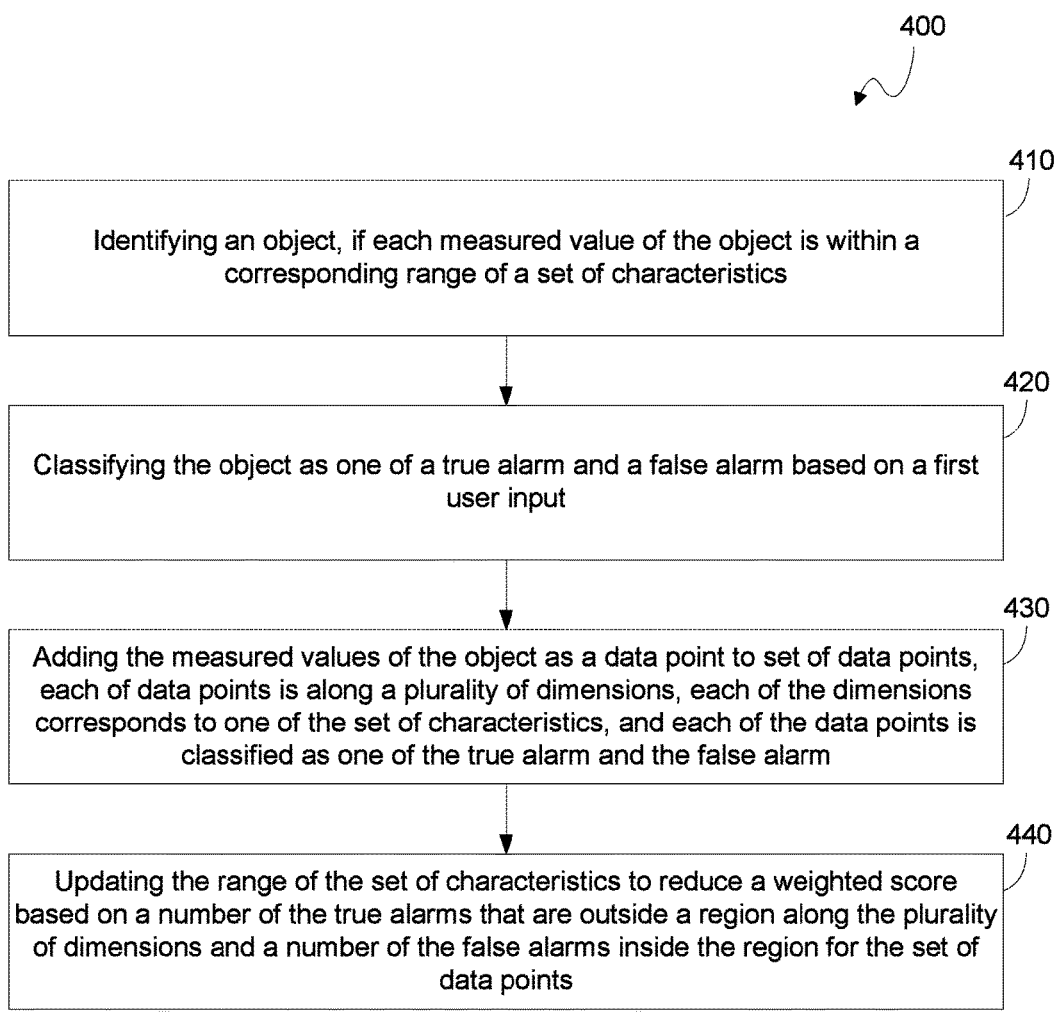
FIG. 4 is an example flowchart of a method for updating a set of characteristics based on a region.

Moreover, the instructions 321-326, when executed by a processor (e.g., via one processing element or multiple processing elements of the processor) can cause the processor to perform processes, such as, the process of FIG. 4. For example, the identify instructions 321 may be executed by the processor 310 to identify an object in an image based on a set of characteristics. For example, the object may be identified if each of the values of the object are within the corresponding range of values for the set of characteristics. The object may be ignored if any of the values of the object are not within the corresponding range of values for the set of characteristics.

The classify instructions 322 may be executed by the processor 310 to classify the object as one of a true alarm and a false alarm based on a first input from a user. The convert instructions 323 may be executed by the processor 310 to convert values of the set of characteristics of the object to a first data point. The add instructions 324 may be executed by the processor 310 to add the first data point to a set of data points. Each of the data points may be along a plurality of dimensions, with each of the dimensions corresponding to one of the set of characteristics. Further, each of data points has been classified as a true alarm or the false alarm, such as by the user.

The define instructions 325 may be executed by the processor 310 to define a region along the plurality of dimensions based on numerical analysis of the set of data points to reduce a score based on the number of true alarms outside the region and the number of false alarms inside the region. The redefine instructions 326 may be executed by the processor 310 to redefine the region to reduce the score if a weight is changed for the true alarm outside the region or the false alarm inside the region based on a second input from the user. The set of characteristics may be updated based on the region. For example, the region may redefine a range of values for the set of characteristics.

FIG. 4 is an example flowchart of a method 400 for updating a set of characteristics based on a region. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 200 identifies an object 112, if each measured value of a characteristic of the object 112 is within a corresponding range of a set of characteristics 114. At block 420, the device 200 classifies the object 112 as one of a true alarm and a false alarm based on a first user input. At block 430, the device 200 adds the measured values of the object 112 as a data point to a set of data points 124. Each of data points is along a plurality of dimensions and each of the dimensions corresponds to one of the set of characteristics 114. Further, each of the data points has been classified 216 as one of a true alarm and a false alarm.

At block 440, the device 200 updates the range of the set of characteristics 114 to reduce a weighted score 236 based on a number of the true alarms that are outside a region along the plurality of dimensions and a number of the false alarms inside the region for the set of data points 124. The device 200 is to define the region based on numerical analysis of the set of data points 124. The weighted score 236 is to provide separate weights 134 to the true alarms outside the region and the missed alarms inside the region. At block 440, the device is to update the range of the set of characteristics 114 by redefining the region to reduce the weighted score 236 if the weight 134 is changed for the true alarm outside the region or the false alarm inside the region based on a second user input.

We claim:

1. A device, comprising:
    a trigger unit to trigger an alarm in response to identifying an object in an image based on a set of characteristics, wherein the object is classified as one of a true alarm and a false alarm;
    a data unit to form a first data point based on values for the set of characteristics of the object and to add the first data point to a set of data points, wherein each of the data points is along a plurality of dimensions and each of the dimensions corresponds to one of the set of characteristics; and
    a parameter unit to determine values for a set of parameters that defines a region of space along the plurality of dimensions, wherein the region is determined based on a numerical analysis of the set of data points to reduce a number of the true alarms outside the region and to reduce a number of the false alarms inside the region, wherein each of the data points of the set of data points corresponds to an object classified as one of the true alarm and the false alarm, the numerical analysis changes at least one of the values of the set of parameters to redefine the region if a weight for at least one of a missed alarm and the false alarm is changed, the missed alarm is the true alarm outside the region, and wherein the trigger unit updates the set of characteristics based on the region.

2. The device of claim 1, wherein the numerical analysis initially provides equal weights for the false alarm and the missed alarm, and the weight for at least one of the missed alarm and the false alarm is changed in order to add greater priority to one of an alarm accuracy rate and an alarm capture rate.

3. The device of claim 2, wherein a greater value is given to the weight of the false alarm relative to the missed alarm to increase the alarm accuracy rate, and a greater value is given to the weight of the missed alarm relative to the false alarm to increase the alarm capture rate.

4. The device of claim 2, wherein the weighting for the false alarm is based on a ratio of a number of the true alarms to a sum of the number of true alarms and false alarms, and the weighting for the missed alarm is based on a ratio of the number of true alarms to a sum of the number of true alarms and missed alarms.

5. The device of claim 1, further comprising:
an alarm unit to calculate a number of the missed alarms and a number of the false alarms from the set of data points for each of a first configuration of the set of parameters and a second configuration of the set of parameters,
wherein the first configuration is based on the set of data points that does not include the first data point and the second configuration is based on the set of data points that includes the first data point.

6. The device of claim 5, wherein one of the first and second configurations is selected, and the first data point is discarded if the first configuration is selected.

7. The device of claim 1, wherein each of the true alarms is classified to a type of category, the parameter unit defines a separate set of the parameters for each of the types of categories, and the parameter unit reclassifies the true alarm of a first type of category as the false alarm when defining the region for a second type of category separate from the first type of category.

8. The device of claim 1, wherein the trigger unit updates the set of characteristics to have values within the region, and the numerical analysis is a downhill simplex method to improve a scene analysis configuration for a video analysis system.

9. The device of claim 1, wherein the trigger unit analyzes a plurality of the images of a video to identify the object, and the set of characteristics includes at least one of a size, shape, speed, color direction and position of the object.

10. The device of claim 9, wherein the set of characteristics further includes at least one of a time the object is in a region of interest (ROI), an edge strength of the object, a texture of the object and a plane of the object, and the plane of the object includes at least one of a background, middle ground and foreground.

11. The device of claim 1, wherein the trigger unit displays at least one of a box, a line and an arrow to indicate at least one of a region of interest (ROI), an object within the ROI, a size of the object, a direction of the object and a speed of the object.

12. A method, comprising:
identifying an object, by a processor of a device, if each measured value of a characteristic of the object is within a corresponding range of a set of characteristics;
classifying, by the processor, the object as one of a true alarm and a false alarm;
adding, by the processor, the measured values of the object as a data point to a set of data points, wherein each of data points is along a plurality of dimensions, each of the dimensions corresponds to one of the set of characteristics, and each of the data points is classified as one of the true alarm and the false alarm; and
updating, by the processor, the range of the set of characteristics to reduce a weighted score based on a number of the true alarms that are outside a region along the plurality of dimensions and a number of the false alarms that are inside the region for the set of data points,
wherein the updating defines the region based on a numerical analysis of the set of data points, and
wherein the weighted score provides separate weights to the true alarm outside the region and the missed alarm inside the region.

13. The method of claim 12, wherein the updating includes updating the range of the set of characteristics by redefining the region to reduce the weighted score if the weight is changed for at least one of the true alarm outside the region and the false alarm inside the region.

14. A non-transitory computer-readable storage medium storing instructions that, if executed by a processor of a device, cause the processor to:
identify an object in an image based on a set of characteristics;
classify the object as one of a true alarm and a false alarm;
convert values of the set of characteristics of the object to a first data point;
add the first data point to a set of data points, wherein each of the data points is along a plurality of dimensions, each of the dimensions corresponds to one of the set of characteristics and each of data points is classified as one of the true alarm and the false alarm;
define a region along the plurality of dimensions based on a numerical analysis of the set of data points to reduce a score based on the number of true alarms outside the region and the number of false alarms inside the region; and
redefine the region to reduce the score if a weight is changed for at least one of the true alarm outside the region and the false alarm inside the region,
wherein the set of characteristics is updated based on the region.

15. The non-transitory computer-readable storage medium of claim 14, wherein the region redefines a range of values for the set of characteristics, the object is identified if each of the values of the object is within the corresponding range of values for the set of characteristics, and the object is ignored if any of the values of the object is not within the corresponding range of values for the set of characteristics.

16. The non-transitory computer-readable storage medium of claim 14, wherein a missed alarm is the true alarm outside the region, and
wherein the instructions cause the processor to increase the weight of the false alarm relative to a weight of the missed alarm to increase an alarm accuracy rate.

17. The non-transitory computer-readable storage medium of claim 14, wherein a missed alarm is the true alarm outside the region, and
   wherein instructions cause the processor to determine the weight of the false alarm based on a ratio of a number of the true alarms to a sum of the number of true alarms and false alarms, and determine a weight of the missed alarm based on a ratio of the number of true alarms to a sum of the number of true alarms and missed alarms.

18. The non-transitory computer-readable storage medium of claim 14, wherein a missed alarm is the true alarm outside the region, and
   wherein the instructions cause the processor to calculate a number of the missed alarms and a number of the false alarms from the set of data points for each of a first configuration of the set of parameters and a second configuration of the set of parameters, wherein the first configuration is based on the set of data points that does not include the first data point and the second configuration is based on the set of data points that includes the first data point.

19. The method of claim 12, wherein a missed alarm is the true alarm outside the region, and the method further comprises:
   determining the weight of the false alarm based on a ratio of a number of the true alarms to a sum of the number of true alarms and false alarms, and
   determining a weight of the missed alarm based on a ratio of the number of true alarms to a sum of the number of true alarms and missed alarms.

20. The method of claim 12, wherein a missed alarm is the true alarm outside the region, and the method further comprises:
   calculating, by the processor, a number of the missed alarms and a number of the false alarms from the set of data points for each of a first configuration of the set of parameters and a second configuration of the set of parameters, wherein the first configuration is based on the set of data points that does not include the first data point and the second configuration is based on the set of data points that includes the first data point.

* * * * *